INVENTORS
EDWARD W. RADTKE
THOMAS P. FARKAS
BY
Teller & McCormick
ATTORNEYS

United States Patent Office 2,946,509
Patented July 26, 1960

2,946,509
TEMPERATURE RESPONSIVE TRANSDUCER

Edward W. Radtke, Manchester, and Thomas P. Farkas, Bloomfield, Conn., assignors to United Aircraft Corporation, East Hartford, Conn., a corporation of Delaware Filed July 30, 1957, Ser. No. 675,091
2 Claims. (Cl. 236—87)

This invention relates to a temperature responsive transducer which may be employed to particular advantage in an air conditioning system.

It is the general object of the invention to provide a transducer which is adapted for use in compartments or conduits or the like containing fluid and to respond to changes in the temperature of the fluid but without response to changes in pressure of the fluid.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
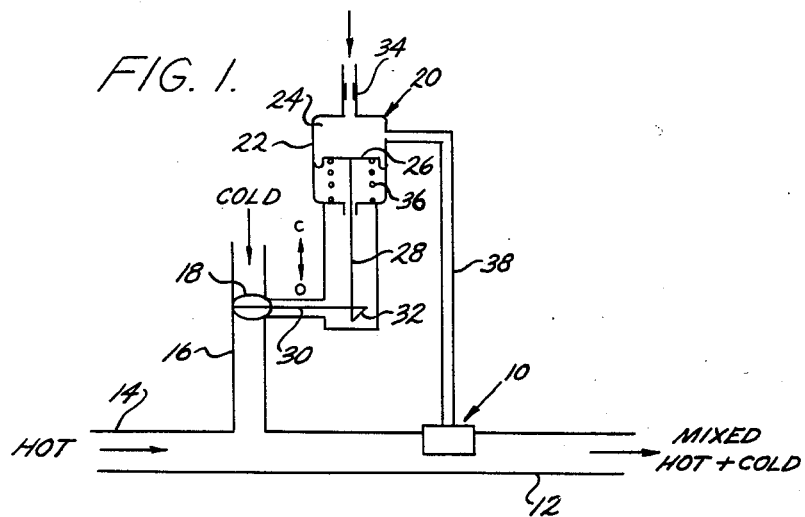
Fig. 1 is a schematic view of a portion of an aircraft air conditioning system wherein the temperature responsive transducer is utilized to actuate valve operating means for the purpose of controlling the temperature of the air within the conduit.
Figure 2:
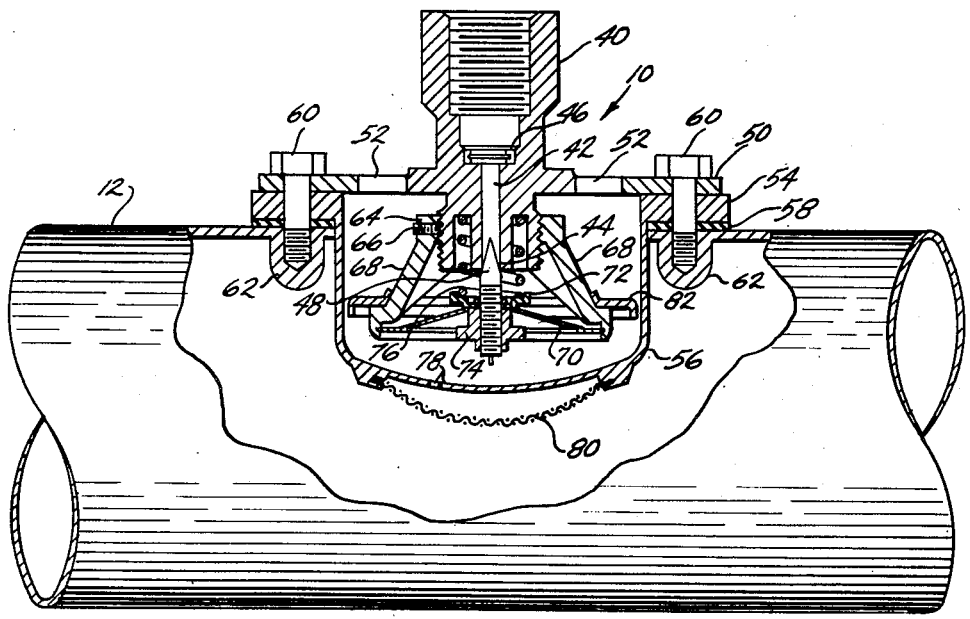
Fig. 2 is an enlarged vertical sectional view of the transducer.

The transducer shown in the accompanying drawing is indicated generally by the reference numeral 10 and is responsive to temperature to control a pressure. The transducer 10 is of extremely simple construction and may be described generally as comprising a bimetallic temperature-sensitive element which carries a valve adapted to open and to close and to control the effective opening of an orifice whereby to control fluid pressure within a chamber and/or a conduit communicating with the said orifice. As such, the transducer is ideally suited for use in an aircraft air conditioning system as the means responsive to temperature for controlling fluid pressure operated actuating means for a valve which in turn controls the temperature of the air stream to which the transducer responds.

Such use or installation of the transducer 10 is schematically illustrated in Fig. 1 of the drawing wherein the said transducer is shown as disposed in a conduit 12 forming a part of an aircraft air conditioning system. The conduit 12 may comprise the air inlet conduit for an aircraft cabin or compartment and the temperature of the air in the conduit must be controlled to satisfy the temperature requirements of the said cabin or compartment. In many conventional aircraft air conditioning systems, a hot air supply conduit 14 and a cold air supply conduit 16 are connected to the cabin inlet conduit 12 and means are provided to control the proportion of the hot and cold air introduced whereby to control the mixed air temperature in the conduit 12. The means for controlling the proportion of the hot and cold air may comprise a valve located in the hot air conduit 14 and/or in the cold air conduit 16. In most cases, it is not necessary to have a valve in both supply conduits but only to provide one valve such as the throttle valve 18 in the cold air conduit 16 whereby the temperature of the mixed air in the conduit 12 is controlled by introducing more or less cold air for mixing with the continuously flowing hot air.

A preferred valve construction includes a fluid pressure responsive actuator 20 which comprises a housing 22 defining a chamber 24 wherein a diaphragm type piston 26 is accommodated. A rod 28 connected with the piston 26 is connected with a valve shaft 30 through the linkage 32 whereby to translate the rectilinear movements of the piston 26 into rotation of the valve shaft 30, the valve 18 being of the butterfly type which is rotated in the conduit 16 to open and to close the same and to control the effective opening therein. Fluid under pressure is introduced to the actuator chamber 24 through a conduit 34 which is connectible to any suitable source which can maintain substantially constant pressure. For purposes of consideration here, it can be assumed that the piston 26 is urged by fluid under pressure in the chamber 24 in a direction which will rotate the valve shaft 30 and the valve 18 to open or to increase the effective opening in the cold air conduit 16 whereby to decrease the temperature of the hot and cold air mixture in the cabin inlet conduit 12. A spring 36 is disposed in the valve actuator housing 22 and bears against the piston 26 in opposition to the fluid pressure whereby to bias the valve 18 toward closed position or to decrease the effective opening in the cold air conduit whereby to increase the temperature of the mixed hot and cold air in the cabin inlet conduit 12. It will be understood, however, that the valve actuator can be oppositely arranged, i.e., to close the valve 18 responsive to fluid pressure and to open the valve 18 responsive to the force of the spring 36.

The transducer 10 provided in accordance with the present invention operates automatically to vary the fluid servo pressure in the actuator chamber 24 whereby to control the position of the valve 18 in the conduit 16 and thus to control the temperature of the mixture of hot and cold air in the conduit 12. That is, the transducer 10 has means defining a vent orifice communicating with a conduit 38 which is connected with the actuator chamber 24, and the transducer includes an orifice-controlling valve which is movable responsive to the temperature in the conduit 12, all as will become apparent from the following detailed description of the transducer.

The transducer 10 includes a housing 40 or other means wherein there is defined a small bore passage 42 having an open end 44 which comprises a vent orifice. The housing 40 is preferably formed similarly to an internally threaded pipe fitting whereby it can be connected with the conduit 38 to effect communication between the valve actuator chamber 24 and the vent orifice 44. It will be understood, however, that the transducer housing 40 can be formed in any other way suitable to provide communication between the orifice 44 and the device wherein fluid pressure is to be controlled. A filter 46 is preferably provided to filter the air or other fluid which is vented through the passage 42 and the orifice 44. The reason for providing the filter is to prevent foreign matter from collecting and in any way obstructing the orifice opening or from interfering with proper operation of a needle valve 48 which is movable relative to the orifice opening.

In the particular transducer embodiment shown wherein it is adapted to be disposed in the conduit 12, the transducer housing 40 has a mounting flange 50 which will span a suitable opening provided in the wall of the conduit 12. The mounting flange 50 has a plurality of openings 52, 52 whereby to assure that the vent orifice 44 can communicate with the atmosphere.

The mounting flange 50 of the transducer housing 40 is received upon the flange 54 of a cup-like container 56 which is inserted within the opening provided in the wall of the conduit 12. The container flange 54 rests upon a gasket 58, and the transducer housing 40 and the container 56 are connected together and to the conduit 12 by means of a plurality of bolts 60, 60 which extend through the flanges on the housing and container and through the gasket 58 and which are threaded in suitable bosses 62, 62 provided internally of the conduit 12.

The end of the transducer housing 40 having the vent orifice 44 is the end which is received in the cup-like container 56. The said end of the transducer housing 40 having the orifice 44 is externally threaded in concentric relationship with the said orifice to receive in threaded engagement and to support an annular frame member 64. A set screw 66 extends through the frame member 64 to secure the same in threaded and adjusted position on the orifice end of the transducer housing 40. The frame 64 has a plurality of downwardly and radially outwardly extending legs 68, 68 all of which have a groove on their inner surface to receive and support the periphery of a temperature sensitive bimetallic disk 70. The bimetallic disk 70 is preferably generally frusto-conically shaped with its convex surface facing upwardly as shown in the drawing toward the vent orifice 44. The disk 70 has a central opening wherein an annular spring seat 72 and an internally bored and threaded plug 74 are fixedly secured. The spring seat 72 is disposed on the convex side of the bimetallic disk 70 and seats a spring 76 which is seated at its other end in a deep annular groove in the transducer housing 40 and surrounding the orifice opening 44 in concentric relationship. The internally threaded body or plug 74 projects to the concave side of the bimetallic disk 70 and it supports the needle valve 48 which is threaded for adjustment therein. In addition to being constructed as described, the bimetallic disk is preferably corrugated for strength and is arranged so that it will move toward or away from the vent orifice 44 in response to temperature changes.

For purpose of consideration here, it can be assumed that an increase in temperature will cause the bimetallic disk 70 to be deflected toward the vent orifice 44 whereupon the needle valve 48 will close or restrict its effective opening while a decrease in temperature will cause the bimetallic disk to be deflected away from the vent orifice whereby the needle valve 48 will open the said orifice or enlarge its effective opening. Obviously, the needle valve 48 can be adjusted and the position of the bimetallic disk with respect to the vent orifice can be adjusted to provide for vent opening and vent closing at selected temperatures and to provide for a specific effective vent opening at a selected temperature. That is, the needle valve 48 can be adjusted or moved relative to the vent orifice 44 by threaded adjustment in the plug or body 74, and the position of the needle valve and the bimetallic disk relative to the vent opening can be adjusted by threaded adjustment of the annular frame 64 on the transducer housing 40, which will thereby adjust the force of the spring 76 which biases the bimetallic disk 70 and needle valve 48 away from the vent orifice.

Now, it will be readily understood that the transducer as thus far described can operate with a certain degree of effectiveness if no container 56 is provided and if the transducer is mounted upon the conduit 12 so that only the bimetallic disk 70 is exposed to the hot and cold air mixture therein. However, such an arrangement is not very desirable, because the bimetallic disk is then subjected to movement with a change in pressure of the mixed hot and cold air in the conduit 12 which destroys the precision of temperature control therein. The provision of the cup-like container 56 is an important feature of the present invention, because the cup avoids the effect of pressure change within the conduit upon the bimetallic disk. The air temperature within the container 56 will, of course, vary with the air temperature within the conduit 12. To assure desirable temperature sensitivity, a small bleed aperture 78 is provided in the container 56 to increase the rate at which temperature will change within the container with a similar change within the conduit. However, the bleed aperture 78 is so small as to have little, if any, effect upon the pressure within the conduit and, certainly, there can be no pressure buildup within the container 56 due to the aperture 78 because the interior of said container is vented to atmosphere through the large openings 52, 52 in the transducer housing flange. A screen 80 is suitably supported externally of the container 56 and within the conduit 12 to cover the bleed aperture 78 to filter the bleed air flow from the conduit to the container. An annular shroud 82 is secured to the legs 68, 68 of the frame 64 and extends radially outwardly therefrom into closely spaced relationship with the container 56. The said shroud cooperates with the bimetallic disk 70 to difine a vented lower chamber within the container 56 which receives air from within the conduit 12 and the shroud prevents ambient air temperature from influencing the operation of the bimetallic disk to an incompatible degree.

Therefore, in accordance with the present invention, there has been provided a transducer which is responsive to temperature to control pressure in a separate operating mechanism. The transducer includes a bimetallic temperature sensitive element which would ordinarily be greatly influenced by the pressure of the air or other fluid whose temperature is being controlled. However, the construction of the container for the transducer avoids the undesirable pressure effect upon the bimetallic element without diminishing its temperature sensitivity and response. The particular transducer described is so arranged that the vent orifice 44 is restricted with a temperature increase in the conduit 12 whereby to increase the pressure in the conduit 38 and in the valve actuator chamber 24 which, as previously described, causes the valve 18 to be opened whereby to introduce more cold air to the mixture and to reduce the temperature of the mixture in the conduit 12. If the mixed air temperature is reduced, the bimetallic element 70 is moved to withdraw the needle valve 48 from the vent orifice 44 whereby to increase the effective size of the vent opening which reduces valve actuator pressure and thereby causes the valve 18 to close so as to diminish the cold air supply and increase the mixed temperature in the conduit 12. It will be readily understood that the bimetallic element can be reversed so as to have the opposite effect upon the throttle valve actuator responsive to temperature increase and temperature decrease, respectively.

The invention claimed is:

1. A transducer for controlling pressure in a fluid pressure device responsive to temperature in a conduit or the like containing a fluid under pressure, the said transducer comprising a housing connectible with the pressure device and defining a passage having a vent orifice in communication therewith, a frame adjustably supported on said housing, a temperature sensitive bimetallic element supported on said frame, a valve adjustably supported by said bimetallic element in operative association with said orifice and movable relative to said orifice with said bimetallic element to control its effective opening and thereby to control pressure in the fluid pressure device, a container provided with a bleed aperture adapted to be disposed in said conduit or the like and adapted to receive said transducer housing, vent orifice, frame, temperature sensitive bimetallic element, and valve therewithin, and means defining an atmospheric vent for said container substantially larger than said bleed aperture so that changes in pressure of the fluid in the conduit or the like are not felt within said container.

2. A transducer for controlling pressure in a fluid pressure operated device responsive to temperature in a conduit or the like containing a fluid under pressure, the said transducer comprising a housing connectible with the fluid pressure operated device and defining a passage having a vent orifice in communication with the fluid pressure operated device, said housing also having a flange for connection with the conduit or the like so as to dispose the vent orifice therewithin which flange is provided with openings to the atmosphere, a generally annular frame adjustably supported on said housing in substantially concentric relationship with said vent orifice, a temperature sensitive bimetallic disk supported by said frame for movement responsive to temperature change toward and away from said orifice, a valve adjustably supported by said bimetallic disk in operative association with said vent so as to control the effective opening thereof responsive to movement of said bimetallic disk, a container provided with a bleed aperture adapted to be disposed in said conduit for connection with said housing flange so as to receive said orifice, frame, bimetallic disk and valve therewithin, the bleed aperture in said container being substantially smaller than said flange openings so that changes in pressure of the fluid in the conduit or the like are not felt within said container.

References Cited in the file of this patent

UNITED STATES PATENTS

| | | |
|---|---|---|
| 1,022,188 | Geissinger | Apr. 2, 1912 |
| 1,764,799 | Kysor | June 17, 1930 |
| 1,871,733 | Petersen | Aug. 16, 1932 |
| 2,271,850 | Zinkil | Feb. 3, 1942 |
| 2,367,162 | Whempner | Jan. 9, 1945 |
| 2,676,757 | Thornbery | Apr. 27, 1954 |
| 2,780,413 | Jensen | Feb. 5, 1957 |
| 2,786,713 | Donaldson | Mar. 26, 1957 |